(No Model.)

F. TRIER.
MACHINE FOR DRESSING STONE.

No. 297,036. Patented Apr. 15, 1884.

5 Sheets—Sheet 1.

Witnesses:
T. C. Brecht
S. S. Sinsabaugh

Inventor:
Frank Trier,
By S. W. Sinsabaugh
Attorney.

(No Model.) 5 Sheets—Sheet 2.
F. TRIER.
MACHINE FOR DRESSING STONE.
No. 297,036. Patented Apr. 15, 1884.
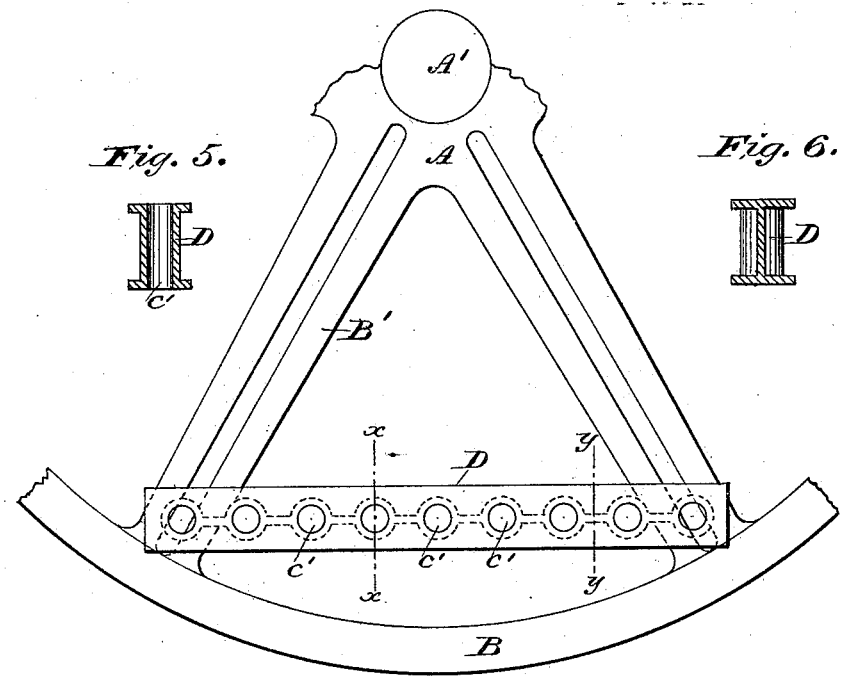
Fig. 4.
Fig. 5.  Fig. 6.
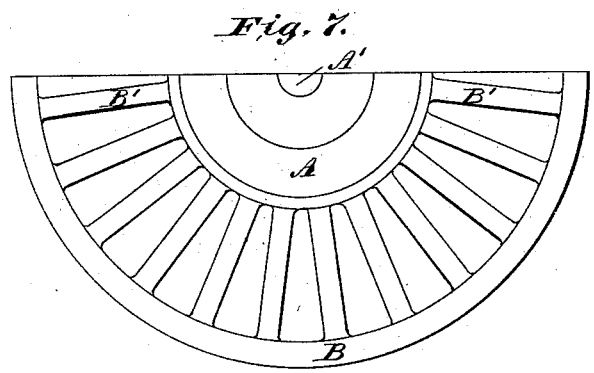
Fig. 7.
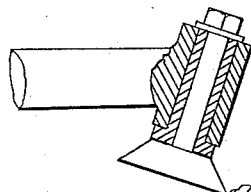
Fig. 15.
Witnesses:
T. C. Brecht
S. S. Ginsabaugh
Inventor:
Frank Trier,
By S. W. Ginsabaugh
Attorney.

(No Model.)  5 Sheets—Sheet 3.
F. TRIER.
MACHINE FOR DRESSING STONE.
No. 297,036.  Patented Apr. 15, 1884.
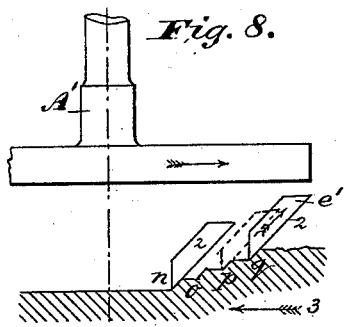
Fig. 8.
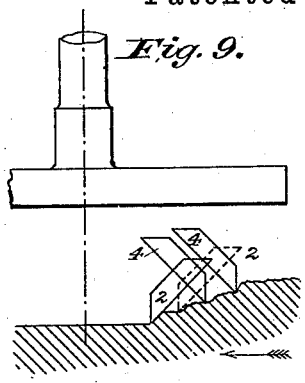
Fig. 9.
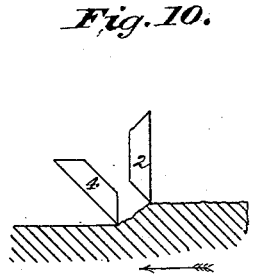
Fig. 10.
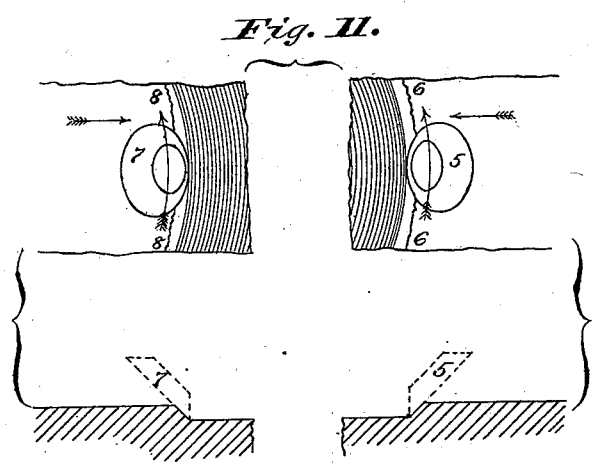
Fig. 11.
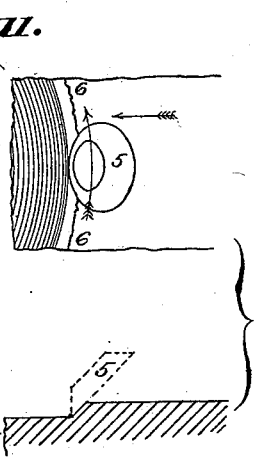
Fig. 11ª
Fig. 12
Fig. 13.
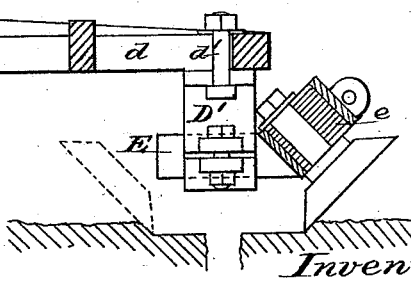
Fig. 14.
Witnesses:
J. C. Brecht
S. S. Sinsabaugh
Inventor:
Frank Trier,
By S. S. Sinsabaugh
Attorney.
N. PETERS, Photo-Lithographer, Washington, D. C.

(No Model.) 5 Sheets—Sheet 4.
F. TRIER.
MACHINE FOR DRESSING STONE.
No. 297,036. Patented Apr. 15, 1884.

Witnesses:
T. C. Brecht
S. S. Sinsabaugh

Inventor:
Frank Trier,
By S. W. Sinsabaugh
Attorney.

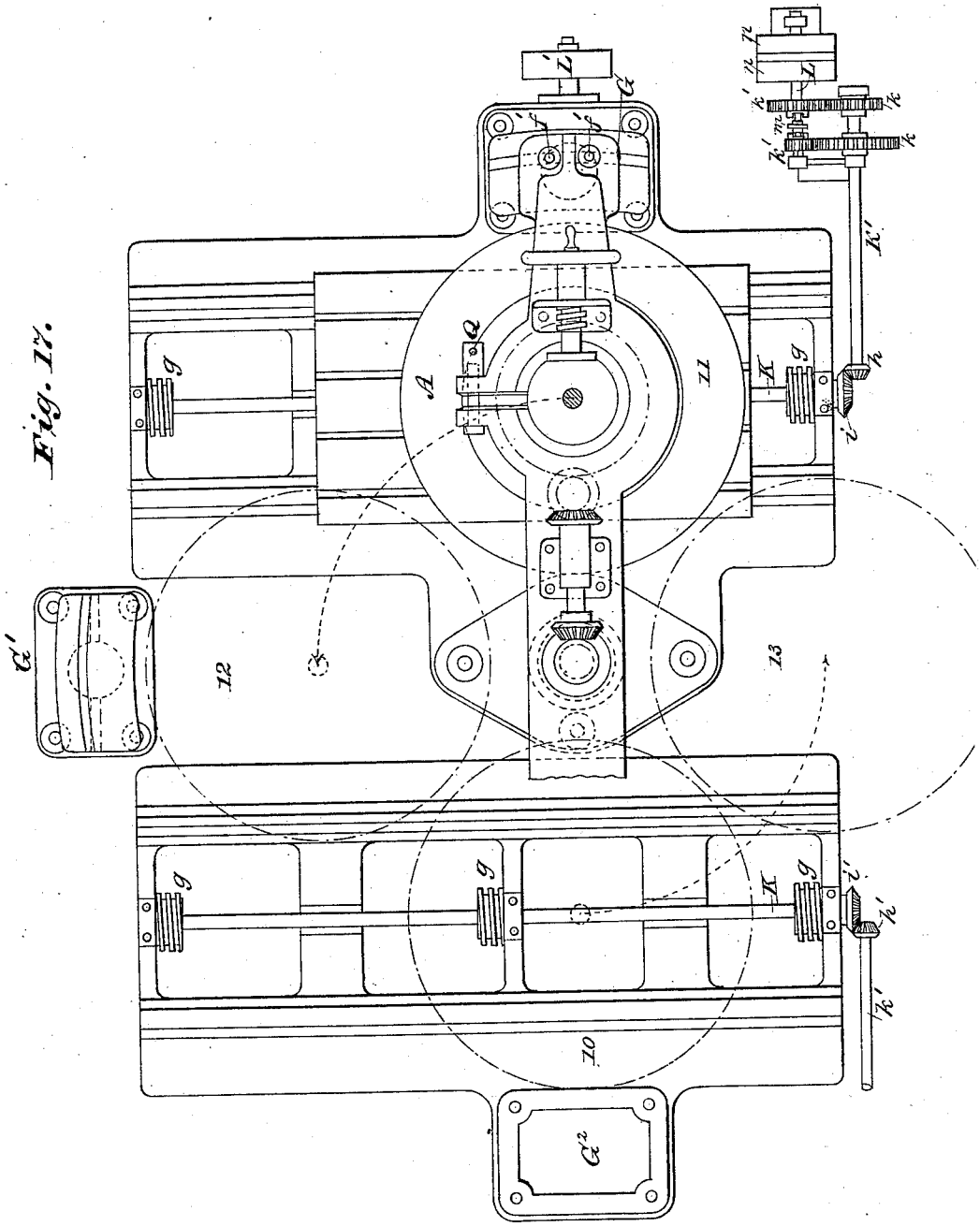

UNITED STATES PATENT OFFICE.

FRANK TRIER, OF LONDON, ENGLAND.

MACHINE FOR DRESSING STONE.

SPECIFICATION forming part of Letters Patent No. 297,036, dated April 15, 1884.

Application filed November 6, 1883. (No model.) Patented in England January 20, 1883, No. 341.

*To all whom it may concern:*

Be it known that I, FRANK TRIER, a subject of the Queen of Great Britain, residing at No. 19 Great George Street, Westminster, London, England, have invented certain new and useful Improvements in Machines for Dressing Stone, of which the following is a specification, reference being had to the accompanying drawings.

My invention relates to machines for dressing stone, and to the form and construction of the chucks for holding the cutters, for which I have obtained Letters Patent in England, No. 341, dated January 20, 1883.

The object of my invention is to provide a chuck or cutter-holder which will carry a great number of cutters at varying or the same angle of inclination, so that plain or molded surfaces may be dressed with facility and ease.

My invention therefore consists in a wheel or disk of any suitable or desirable size, provided with radial arms which are slotted or grooved to receive the cutter-carriers, said cutter-carriers being adjustable on said arms to and from the axis of the chuck.

My invention consists, further, in mechanism for holding and driving said chucks, so as to be readily adjustable to meet the requirements of face and edge work.

My invention consists, further, in the method of cutting plain moldings on the edge or face of the stone by means of cutters mounted on revolving chucks, said cutters being adjusted on the chuck in relation to the form to be given the molding.

My invention consists in certain details of construction and operation of parts hereinafter more fully set forth.

Figure 1:
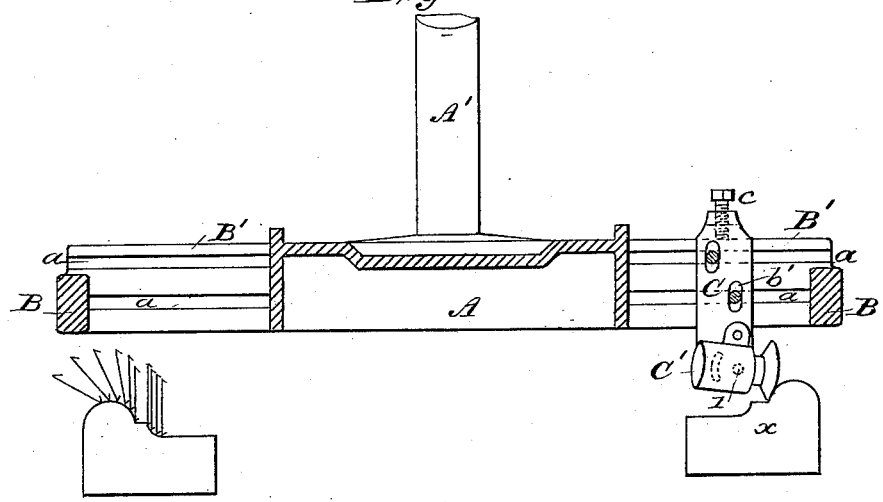
Figure 2:
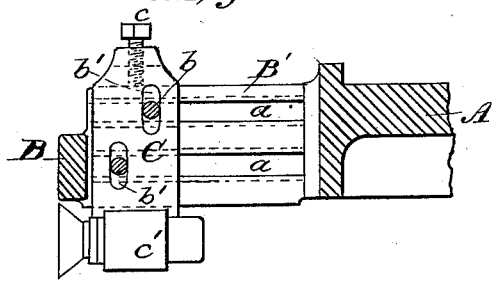
Figure 3:
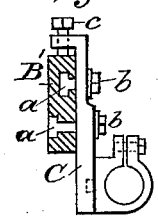
Figure 16:
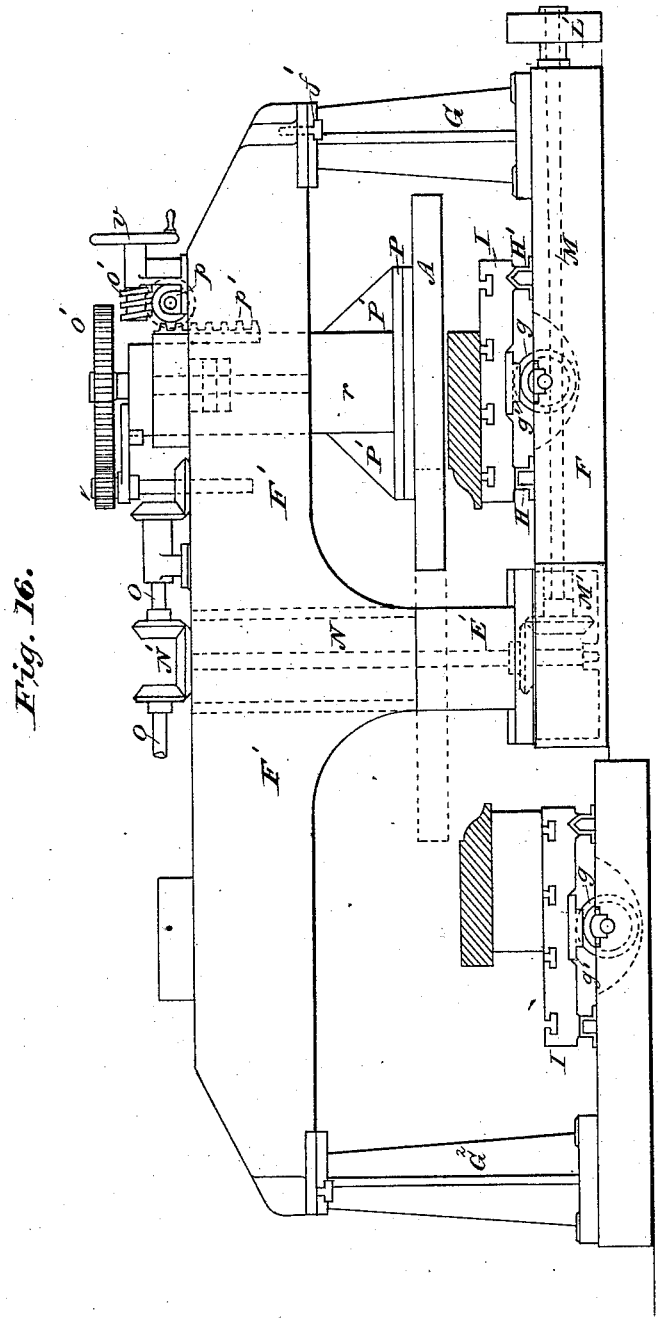

Referring to the drawings, Figure 1 is a sectional view of one form of my improved chuck for holding the cutters. Fig. 2 is a side elevation of one of the radial arms of the chuck. Fig. 3 is a sectional end view of one of the radial arms, showing the devices for securing and adjusting the cutter-holder. Fig. 4 is a fragmentary view of another form of chuck in which the radial arms are slotted to hold an adjustable cutter-holder. Figs. 5 and 6 are sectional views of the cutter-carrying bar on the lines $x\ x$ and $y\ y$ of Fig. 4. Fig. 7 is a top or plan view of one-half of the chuck shown in Fig. 1. Fig. 8 is a side elevation of a revolving chuck, showing cutters in position for shearing the stone. Fig. 9 is a similar view, showing some of the cutters shearing and some splitting. Fig. 10 is a side elevation, showing one cutter shearing and one cutter splitting the stone. Fig. 11 is a view in plan and in elevation of the cutters in working position and the effect of the same upon the stone. Fig. 11$^A$ is an end view of a stone with cutters in position for forming a molding. Fig. 12 is a plan view of a stone in which a curved molding is produced. Fig. 13 is a sectional view of a circular or rectangular stone with the cutters arranged to form a molding. Fig. 14 is a sectional view of a circular chuck having radial slots in which the cutter-holding devices are secured. Fig. 15, Sheet 2, is a sectional view of a cutter secured at an angle in a rigid arm or bar. Fig. 16 is a side elevation of one form of machine adapted to hold and operate the chuck and stone. Fig. 17 is a plan view of the devices shown in Fig. 16.

A is the cutter-holding disk, plate, or chuck, having a central driving-spindle, A', an outer rim, B, connected to the hub or driving-spindle by radial arms B', as shown in Fig. 4. The chuck may be provided with any desired number of radial arms to receive a considerable number of cutter-holders—that is to say, thirty or forty or more—and in cases where only a small part of the whole number of cutters is required to complete the dressing, planing, sinking, or molding operation—say six, for example—there may be mounted on the chuck as many sets of six as it will hold, by which means the amount of work done by each revolution of the chuck is in that proportion increased.

The radial arms of the chuck shown in Figs. 1 and 7 are provided with slots $a$, of T shape in cross-section, to receive T-headed bolts $b$, by which the cutter-carrying hanger C is adjustably secured to the radial arm. The hanger C is provided with vertical slots $b'$, through which the T-headed bolts pass, and a set-screw, $c$, which passes through the bent upper end of the hanger and rests on the upper edge of the radial arm, serves to adjust the hanger with the cutters attached thereto toward or from the stone. C' is the cutter-holder, pivoted to the hanger at 1, and adjustable by means of a segmental slot (shown in dotted lines) and a set-screw, whereby the cutting angle of the cutter can be adjusted.

In Fig. 4 I have shown a modified form of chuck, in which the radial arms are farther apart and are slotted in a vertical direction to receive bolts for securing the cutter-carrying bar D to the radial arms. I have shown a straight bar for carrying the cutters; but a segmental or other shaped bar may be used, which can be readily placed in any desired position, so as to present the cutters to the stone to meet the requirements of plain or molded surfacing. The bars D may be held in position on the radial arms by special screw-bolts and nuts made for that purpose, or by the cutter-holder passing through the slot and bar. The preferred form of constructing the bar D is that of an I-beam, having the web expanded at intervals to form openings or sockets $c'$ for the reception of the cutter-holder. It will be observed that by means of this cutter-holding bar D the relative arrangement of the cutters with the stone can be changed to any desired extent within the limits or range of the slotted arms.

In Fig. 14 I have shown in a sectional view still another form of chuck for holding the cutters, which consists of a plate or disk with radial slots $d$, in which the bolts for holding the cutter-carrier D' can be moved and adjusted to any desired point. In this figure the cutter-bearing end of the bar E is formed into a clamping-socket, and is shown as carrying the cutter-spindle in an eccentric holding-tube, $e$.

In giving a description of the action of the cutters on the stone, which I will now proceed to do, it will be understood that the cutters are mounted so as to rotate on their axis by frictional contact with the stone, and thus a rolling cut is produced, which is the most effective way of attacking a stone; also, that this motion of the cutter on its own axis is independent of the rotary motion of the chuck in which the cutters are secured.

Fig. 8 represents in diagram a chuck revolving around its axis A', carrying suitably-attached cutters 2 2. The stone to be operated upon is carried forward in the direction indicated by the arrow 3. The cutters, as they are carried round on the chuck, roll when they touch the stone, and shear or shave off the portion to be removed.

In Figs. 9 and 10 the cutters 2 2 are shown as shearing while the cutters 4 4 are spliting. The shearing-cutters, or a combination of shearing and splitting cutters, can be set so that the cut produced will be convex or concave, according to the inclination of the cutters and the movement of the stone relative with the chuck, which will be better understood by reference to Fig. 11, which illustrates plan and side views.

In Fig. 11 the cut of the cutter 5 is concave toward the dressed surface, and forms an acute angle at the edge of the stone at 6, whereas by the position of the cutter 7 the cut will be convex, and forms with the edge of the stone an obtuse angle at 8.

The cutters in 8, 9, and 10 would be dressing a flat surface; but it will be understood that (say in the case of Fig. 8) if the track of the cutter $e'$ were less in diameter than the width of the stone, or if the chuck were only so placed relatively to the stone as to dress it only partially, then the dressed surface will be bounded by the stepped inclines $n\ o\ p\ q$, and, with the facilities herein shown and described for adjusting the cutters, it will be seen that instead of the steps $n\ o\ p\ q$ a molding may be produced. This is clearly shown in Figs. 1 and 11$^A$, where the cutters are arranged so that their tracks form the nosing of a step, and so that their inclinations coincide as nearly as possible with the varying curves of Fig. 12, which shows the stone in plan view. This view gives a clear idea of how the cutters, while describing circles, eventually produce a straight molding, and it is obvious if the forward movement of the stone be stopped, then the cutters will produce a curved molding, as shown. By giving a transverse movement to the chuck or stone, (the said movement being governed by hand, or automatically by gearing, or by the action of a templet or mold,) the stone, as it moves past or under the revolving chuck, may be molded, sunk, or shaped to any desired curve. In case of a deep molding which might require more cutters than could be mounted conveniently on one chuck, I employ one or more additional chucks, the stone under operation passing from one to the other.

In Fig. 11$^A$ the cutters are all shown shaving—i. e., each cutter shaves away a layer of the stone to be removed, the layer above having been removed by the preceding cutter, and that by passing a stone on each side of the chuck a molding will be cut on both. A stone so placed is shown at $x$ in Fig. 1, and by skewing the cutter it can be made to shave out a curve, as shown in same figure.

Fig. 13 shows the cutters partly shaving and partly splitting, and by turning the stone on its axis $y\ y$ an exterior circular molding will be cut.

In Fig. 14 a cutter is shown mounted eccentrically in a bushing, which is seated in an angular hole or socket in the arm of the chuck or holder.

The revolving chucks or plates which carry the cutters may be mounted on a machine of the general form of an ordinary planing-machine or of a drilling-machine, radial or otherwise operating, so that the cutters are carried around in horizontal planes, or the cutters are made to revolve in vertical planes, in which case the chuck will be carried on a saddle capable of sliding vertically on the face of a suitable standard.

The chucks may be carried on a machine of special construction, which for many purposes would possess advantages. This machine is shown in elevation in Fig. 16 and in plan in Fig. 17, and consists of a pillar, E', bolted to the bed-plate F.

F' F' are arms projecting from a central socket, which is bored to fit upon the upper part of the pillar E', and rests on the shoulder $f$, and by which means the arms F' F' can be turned around.

G G' G² are pedestals over which the arms F' may be brought. Their height is such that when the ends of the arms are brought over them they rest upon them and are secured firmly by the bolts $f'$. The pedestal opposite G' is not shown in the drawings.

H and H' are respectively flat and V-shaped rails bolted to the foundation-plates, and I I are the stone-carrying tables which slide on the rails H and H', and are worked by the worms $g\ g\ g$, gearing into worm-racks $g'\ g'$, secured to the under side of the tables I I.

$h\ h'$ are bevel-gear wheels which mesh with the bevel-gear wheels $i\ i'$ on the worm-shafts K K, by which means the worm-wheels are rotated.

K' K' are shafts, on one end of which the bevel-gear wheels $h\ h'$ are secured, and on the other end of said shaft are mounted large and small pinion-wheels $k\ k$, which mesh with corresponding pinion-wheels, $k'\ k'$, mounted on the driving-shaft L. The pinion-wheels $k'\ k'$ are thrown in and out of gear with the pinion-wheels $k\ k$ by means of a clutch, $m$, the proper manipulation of which imparts a quick or slow motion to the tables.

N N are open and cross-belt pulleys secured to the shaft L, to reverse the motion or movement of the tables. Each of the arms F' F' carries a cutter-holding plate or chuck, A, of any of the forms heretofore described. Only one chuck is shown; but it will be understood that each chuck or plate is provided with mechanism for driving it, which I will now describe with respect to one of them.

L' is a belt-pulley mounted on the outer end of the shaft M, and by which power is applied to said shaft. On the inner end of shaft M is secured a bevel-wheel, M', which meshes with a similar wheel on a vertical shaft, N. The vertical shaft N is provided with a bevel-wheel, N', which imparts motion to the shafts O O and intermediate gearing to the pinion-wheels O', (only one shown,) on the shaft of which the cutter-carrying chucks are secured, and by which they are made to revolve.

$o$ is a hand-wheel for operating the worm $o'$, worm-wheel $p$, and rack $p'$, for raising and lowering the chuck. The spur-pinion $q$, being carried by the bracket $q'$ on the cylinder $r$, rises and falls with the chuck.

$r$ is a cylinder, which carries the shaft $r'$ of the pinion-wheel, on the lower end of which the chuck A is keyed. On the lower end of the cylinder $r$ is cast a ring, P, strengthened by ribs P', to take the upward pressure or thrust of the chuck A when working.

Q is a clamping-screw by which the cylinder $r$, when set, is firmly held in the socket of the arm.

The chucks have different forms suited to the work to be done, and the cutters are fixed upon them in various ways, as already described.

When the arms F' F' stand across the lines of rails, their ends resting on the pedestals G G², the cutters are in the position marked by the circles 10 and 11, and are conveniently placed for surfacing or sinking. When the arms are placed in line with the rails, with the ends resting on the pedestal G' and that opposite to it, the chucks will be in the positions marked by the circles 12 and 13, and in this position are conveniently placed to dress the edges of stones or to form moldings. Two stones can in this position be worked at the same time, and, if required, by both chucks.

The chucks and tables are preferably set at different levels, so that in positions 12 and 13 the chuck at 12 can dress one part and that at 13 the other part.

With a view to enlarging the capabilities of those machines in which the chuck is not carried upon a movable or radial arm, I sometimes make the bed of the machine with slides at right angles to one another, on either of which the table or tables carrying the stones can move.

For the purpose of utilizing the surfacing capacity of the chuck, the table would travel between the standards carrying the chuck. These standards are preferably made similar to those of a steam hammer. By making a table or tables travel on the rails which pass at right angles to those running between the standards on either side of the latter, the edges of one or two stones can be molded by the chuck at the same time, the standards being too close together to admit of the stones passing between them, so that their edges could be presented to the chuck.

I do not claim in this application a cutter-holder adapted to be turned in its bearings to adjust the angle of the cutter, or an eccentric bushing operating in the same manner to adjust the cutter with relation to the stone; neither do I claim a cylinder or tube mounted in a pivoted clamp as a means for adjusting the cutters, or a cutter-carrier in which the tube or cylinder for holding the bushing of the cutter-carrying spindle is clamped between spring-jaws, as these features are embraced in an application filed by me November 6, 1883. Serial No. 110,969.

Having thus described my invention, what I claim, and desire to secure by Letters Patent, is—

1. In a stone-dressing machine, a cutter-carrying chuck or head having a series of arms for holding the cutter-carrying slides, said slides being adjustable toward and from the stone in a line parallel with the axis of vibration of the chuck, as set forth.

2. In a stone-dressing machine, a cutter-holding chuck or head consisting of a central spindle having arms radiating therefrom, and joined by an outer rim, in combination with cutter-carrying slides adapted to be vertically and horizontally adjusted on the arms, as set forth.

3. In a stone-dressing machine, a cutter-holding chuck having a series of slotted arms, to each of which are secured one or more slides, said slides being adjustable to and from the stone to be dressed in lines parallel with the axis of vibration, and also adjustable in lines at right angles to the line or axis of rotation, in combination with cutters and cutter-holders pivoted to the slides, said cutter-holders being adjustable in a circular direction around said pivotal point, as set forth.

4. As an improvement in the art of dressing stone with moldings or irregular surfaces thereon, a rotating chuck carrying a gang or gangs of cutter-carrying slides, said slides being adjustable on the chuck in vertical and horizontal planes, and to which are pivotally attached cutter-holders bearing independently-rotating cutters capable of adjustment around said pivotal point, whereby the cutters are adjusted and arranged to act on the stone at different angles and at varying depths, to give the required shape and finish to the surface of the stone by the continual rotation of the chuck, as set forth.

5. In a stone-dressing machine, a centrally-pivoted and horizontally-swinging beam supported at its ends (when in working position) by columns $G$ $G'$ $G^2$, said beam being provided with cutter-holding chucks, in combination with a vertical shaft passing up through the pivot of the beam, which is geared to the main driving-shaft at the bottom and to shafts at the top, for driving the cutter-holding chucks, as set forth.

In testimony whereof I affix my signature in presence of two witnesses.

FRANK TRIER.

Witnesses:
   J. EDW. BEESLEY,
   G. S. PURRY,
*Both of 2 Pope's Head Alley, Cornhill, London, Gentlemen.*